United States Patent
Han et al.

(10) Patent No.: US 7,013,226 B2
(45) Date of Patent: Mar. 14, 2006

(54) REFLECTOMETER WITH ECHO CANCELLER

(75) Inventors: Chunming Han, Manalapan, NJ (US); Amod V. Dandawate, Basking Ridge, NJ (US); Xiao-Feng Qi, Freehold, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/686,340

(22) Filed: Oct. 14, 2003

(65) Prior Publication Data

US 2005/0080599 A1    Apr. 14, 2005

(51) Int. Cl.
   *G01R 19/00* (2006.01)
   *G06F 15/00* (2006.01)
   *H04B 3/20* (2006.01)

(52) U.S. Cl. .................. 702/57; 702/189; 702/191; 370/286

(58) Field of Classification Search .......... 702/57, 702/58, 62, 65, 87, 189, 190, 191; 370/276, 370/286, 289, 290, 291; 379/406.1, 406.05, 379/406.06
See application file for complete search history.

(56) References Cited

U.S. PATENT DOCUMENTS

| 4,571,465 A * | 2/1986 | Brie et al. ................... 370/291 |
| 4,602,133 A * | 7/1986 | O'Neill ....................... 370/286 |
| 6,944,290 B1 * | 9/2005 | Georgiev ............... 379/406.06 |
| 2002/0048265 A1 * | 4/2002 | Glass ......................... 370/286 |
| 2002/0097863 A1 * | 7/2002 | Rahamim et al. ...... 379/399.01 |

* cited by examiner

*Primary Examiner*—Bryan Bui
(74) *Attorney, Agent, or Firm*—Kacvinsky LLC

(57) ABSTRACT

Various embodiments are described for an improved reflectometer and/or a modem or other device which may include an improved reflectometer. An apparatus may include a pulse transmitter to transmit a pulse to a line to be tested, a receiver adapted to receive a reflection of the transmitted pulse, and a zero-echo canceling system coupled to the transmitter and receiver. The zero-echo canceling system may be adapted to at least partially cancel a received zero-echo by generating a zero-echo canceling signal based on the transmitted pulse and to calculate an error signal as a difference between the zero-echo and the zero-echo canceling signal.

17 Claims, 6 Drawing Sheets

REFLECTOMETER WITH ECHO CANCELLER

BACKGROUND INFORMATION

Time domain reflectometry (TDR) may include an analysis of a conductor or other line (e.g., wire, twisted pair, coaxial cable, fiber optic line) by sending a pulsed signal into the line and then examining the reflection of that transmitted pulse. TDR may be useful in a variety of different applications. For example, TDR may be used to measure the length of a line or loop based on the delay of the reflection, or to measure the quality of the line, such as by examining the amplitude or other qualities of the reflection. TDR may be used, for example, to qualify or test a line for the suitability of Digital Subscriber Line (DSL) or cable communications, etc.

When TDR is performed, unwanted signal echoes can sometimes be a problem. For example, in many cases, the same port may be used both to transmit the pulse onto the line and to receive the reflected pulse from the line. In some cases, due to a reflection from the line, one of the paths that the transmitted pulse may travel is from the transmitter directly to the local receiver. This may create an echo (or unwanted reflection) that may be, in some cases, received almost immediately (e.g., 1–10 microseconds) after the transmission of the pulse, due to the very short path. This echo or unwanted reflection typically does not characterize the line, and therefore, may not be helpful in the TDR analysis of the line or loop. This echo or unwanted reflection which may begin near (e.g., just after) the time of pulse transmission, or near time zero, may be referred to herein as zero-echo (e.g., the echo substantially near time zero).

Due to the short path, a zero-echo may often have a relatively large amplitude and may even saturate the receiver. As a result, the zero-echo may create a blind time interval during which the reflectometer may not be able to measure any other reflections. Depending on the configuration, many other types of unwanted echoes or unwanted reflections may occur as well.

FIG. 1 is a diagram illustrating a conventional reflectometer. The reflectometer may send a pulse from pulse transmitter 105 to the loop (or line) 115 and measures the reflection with the local receiver 110. The receiver may receive the pulse that travels the path ABCBD, which is the desired reflection to be received (e.g., to analyze the loop or line). The receiver may also receive a pulse that travels the path ABD, which may be referred to as zero-echo. If a reflected signal substantially arrives at the receiver before the zero-echo has dissipated or died out, the two reflections may merge and typically cannot be separated. This may create a blind time interval during which a conventional reflectometer may not be able to measure reflections. Therefore, a need may exist for an improved reflectometer.

DETAILED DESCRIPTION

In the detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Embodiments of the present invention may include apparatuses for performing the operations herein. This apparatus may be specially constructed for the desired purposes, or it may comprise, in part or in whole, a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits disclosed herein may be used in many apparatuses such as in transmitters and receivers of a communication system, modulator/demodulators (Modems), DSL modems, cable modems, reflectometers, and other systems or devices, such as computers, gateways, bridges, hubs, and a wide variety of test equipment, such as reflectometers and the like, although the scope of the invention is not limited in this respect.

Figure 1:
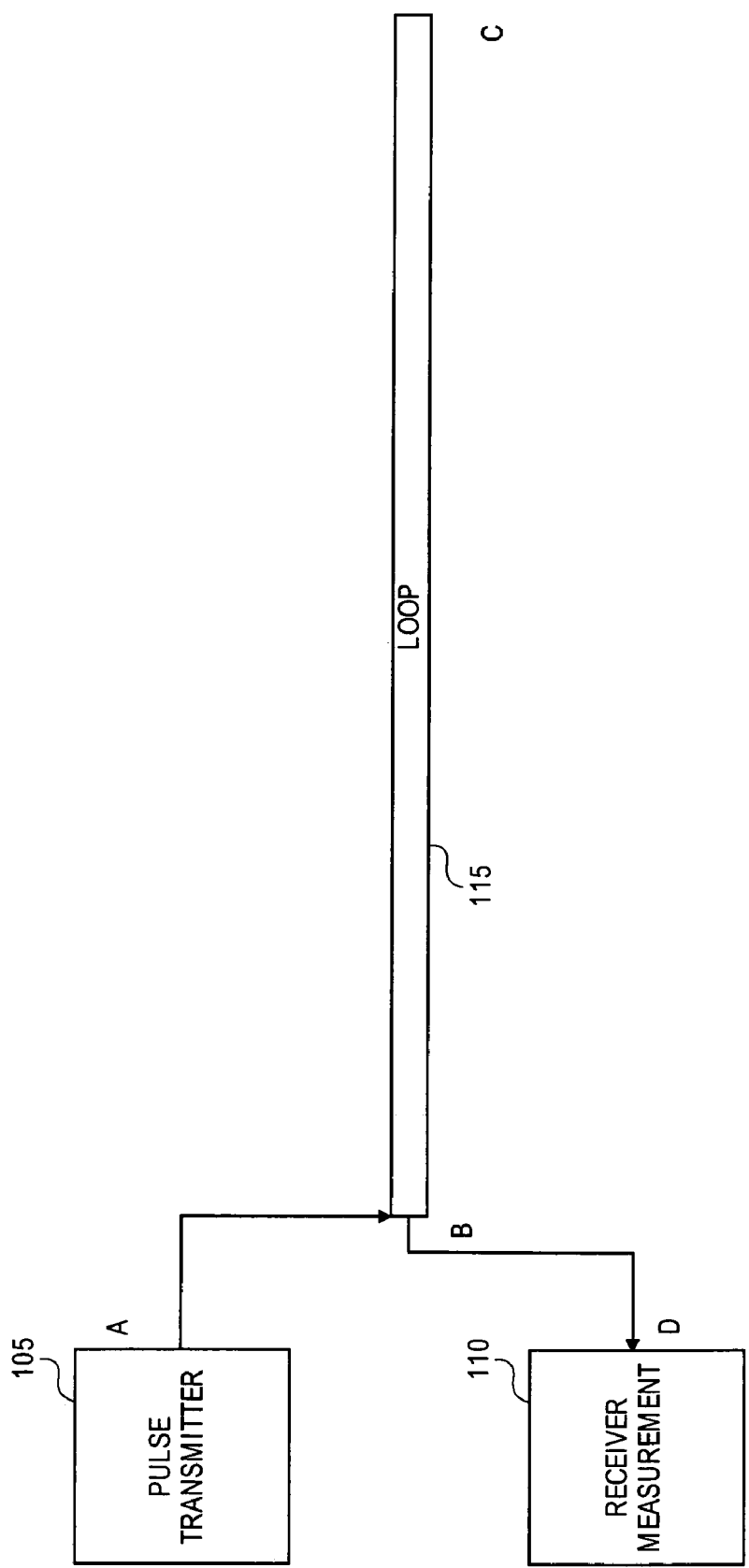
FIG. 1 is a diagram illustrating a conventional reflectometer.
Figure 2:
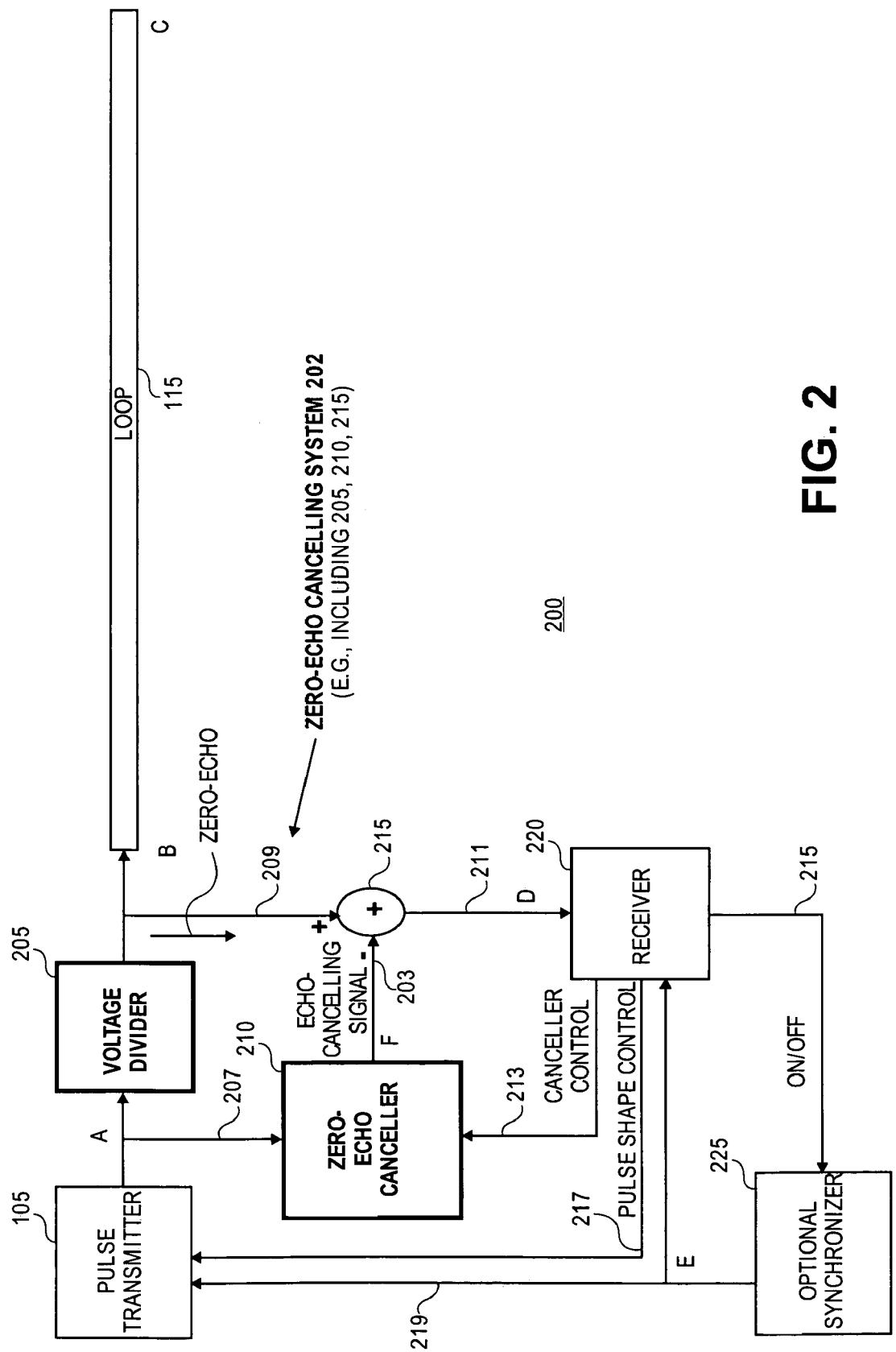
FIG. 2 is a diagram illustrating a reflectometer according to an example embodiment.

Referring to the Figures in which like numerals indicate like elements, FIG. 2 is a diagram illustrating a reflectometer according to an example embodiment. The reflectometer 200 of FIG. 2 may include a pulse transmitter 105 to transmit pulses and a receiver 220 to receive and measure one or more pulse reflections. Reflectometer 200 may advantageously also include a zero-echo canceling system 202 to detect and at least partially cancel or decrease a zero-echo or other reflections. Zero-echo canceling system 202 may include, for example, a voltage divider 205, a zero-echo canceller 210 and a subtraction circuit 215, although the invention is not limited thereto. The zero-echo canceling system 202 will now be briefly described.

Referring to FIG. 2, voltage divider 205 may be coupled between an output of pulse transmitter 105 and loop (or line) 115. A voltage divider may be a circuit, for example, to provide a voltage that is different from a voltage at an input. A voltage divider, such as voltage divider 205, may for example include one or more resistors to cause a voltage drop across the resistor(s) when current flows through the resistor(s) based on Ohm's law, although the invention is not limited thereto. In this example embodiment, the voltage output by voltage divider 205 at point B may be less than the voltage input to divider 205 at point A.

In another embodiment, voltage divider 205 may have an impedance or resistance that substantially matches the characteristic impedance of loop 115, so as to decrease the number of reflections across the loop. For example, if the characteristic impedance of loop 115 is 100 Ohms, then a resistor of 100 ohms may advantageously be used for voltage divider 205.

Referring to FIG. 2 again, a zero-echo canceller 210 may be coupled via line 207 to an output of pulse transmitter 105 and coupled via line 213 to receiver 220. According to an example embodiment, zero-echo canceller 210 may generate a zero-echo canceling signal onto line 203 to at least partially cancel or attenuate a zero-echo. The zero-echo canceling signal output on line 203 may be generated based on a transmitted pulse received via line 207. According to an example embodiment, zero-echo canceller 210 may comprise a variable voltage divider (e.g., including one or more variable resistors or potentiometers) to output a variable portion of the transmitted pulse onto line 203 as a zero-echo canceling signal. In an example embodiment, the zero-echo canceling signal may comprise a signal that has substantially the same shape of the transmitted pulse, but the amplitude of the zero-echo canceling signal may be adjusted, although the invention is not limited thereto.

A subtraction circuit 215 may be coupled via line 209 to an output of voltage divider 205 (e.g., at point B) and is coupled to an output of zero-echo canceller 210 via line 203, and outputs a signal via line 211 to receiver 220. In an example embodiment, subtraction circuit 215 may subtract the zero-echo canceling signal received via line 203 from the zero-echo received via line 209, to produce an output via line 211 that is coupled to receiver 220.

In operation of FIG. 2, pulse transmitter 105 transmits a pulse that is passed through voltage divider 205 before being sent to the loop 115 at point B. The transmitted pulse is also input via line 207 to zero-echo canceller 210. According to an example embodiment, zero-echo canceller 210 may output via line 203 a variable portion of the transmitted pulse to subtraction circuit 215. This output on line 203 from zero-echo canceller 210 may be described as a zero-echo canceling signal since it may be used to at least partially cancel or decrease the zero-echo.

A zero-echo (short path reflection) of the transmitted pulse may be passed via line 209 to subtraction circuit 215, due to reflection at point B, for example. In order for the desired signal of interest being received to have substantially no presence at point A, the pulse transmitter 105 may be designed to have a substantially low output impedance (e.g., around 1 Ohm output impedance), although the invention is not limited thereto. This low output impedance of pulse transmitter 105 may allow any return echo (reflection) to be substantially eliminated at point A due to the large voltage drop across voltage divider 205 (e.g., around 100 ohms).

Subtraction circuit 215 may, for example, calculate the difference between the zero-echo (short path reflection provided via path ABD) received via line 209 and the zero-echo canceling signal on line 203 (which may be a variable portion of the transmitted pulse), and outputs this difference via line 211 to receiver 220 as an error signal. Receiver 220 may then control or adjust the zero-echo canceller 210 (e.g., via a canceller control signal on line 213) to more closely match the zero-echo canceling signal to the zero-echo. In this manner, the zero-echo canceling system 202 may operate to decrease the error signal input on line 211 and better attenuate or cancel the zero-echo before it is received by receiver 220.

This process (e.g., generating a pulse, generating a zero-echo canceling signal based on the transmitted pulse, calculating the difference between the two signals or error signal, and adjusting the zero-echo canceller to decrease the error signal) may be repeated, so that the zero-echo canceller 210 may be tuned or adjusted to decrease or substantially cancel the zero-echo (short path reflection) as received by the receiver 220. By substantially canceling or at least decreasing the zero-echo received at the receiver 220 using the adjustable zero-echo canceling signal, the blind time interval for receiver 220 may be substantially eliminated or at least reduced. By decreasing or attenuating the zero-echo at the receiver 220 using this technique, this may allow receiver 220 to more effectively detect and measure the desired (full path) reflection after it traverses path ABCBD. The zero-echo canceller 202 may sufficiently cancel or at least partially attenuate the zero-echo and allow the full reflection (e.g., echo received via path ABCBD) to be detected and measured by receiver 220, even for short loops where the full reflection may partially overlap with the zero-echo.

According to an example embodiment, cancellation or reduction of the zero-echo may be assisted or simplified due to the occurrence or timing of the zero-echo near or just after the pulse transmission (near time zero). The close proximity in time of the zero-echo to the pulse transmission (e.g., 1–2 microseconds after the pulse transmission) may allow a zero-echo canceling signal to be generated based on the transmitted pulse and then used to at least partially cancel or offset the zero-echo before it arrives at the receiver 220.

Subtraction circuit 215 may be used to then subtract the echo canceling signal from the zero-echo, although the invention is not limited thereto. Alternatively, a circuit (e.g., zero-echo canceller) may be used to invert the amplitude of the received pulse or portion thereof and generate a zero-echo canceling signal that has a substantially equal but opposite amplitude as compared to the zero-echo. This zero-echo canceling signal may then be summed or added with the output from voltage divider 205 (e.g., using a summing circuit rather than a subtraction circuit), although the invention is not limited thereto. Therefore, there terms "adding" or "summing" or "combining" may encompass both adding and subtracting, since it may depend on the polarity or sign of the amplitude of the zero-echo canceling signal. Subtraction circuit 215 may be more generally a combining circuit for combining the zero-echo with the zero-echo canceling signal.

Zero-echo canceling system 202 may also include a synchronizer 225 to synchronize clocks for both the pulse transmitter 105 and the receiver 220. Synchronizer 225 may allow pulse transmitter 105 and receiver 220 to be synchronized for time zero, which is the time the pulse is transmitted from transmitter 105. This may allow the receiver to more accurately measure the delay for the echo, and therefore, more accurately measure the length of the loop BC.

Receiver 220 may also control the shape of the transmitted pulse output from transmitter 105. A wider pulse may be needed for longer loops, so the echo is not attenuated too much. However, more accurate measurements for the loop can sometimes be obtained using a transmitted pulse that is narrower. Thus, it may be desirable to use a narrower pulse for shorter loops to improve timing accuracy, and to use a wider pulse for longer loops. After one or more pulse transmissions and measurements at receiver 220 of the echo, the pulse width may be adjusted based on the amplitude or other characteristics of the echo received at receiver 220, for example, although the invention is not limited thereto.

Figure 3:
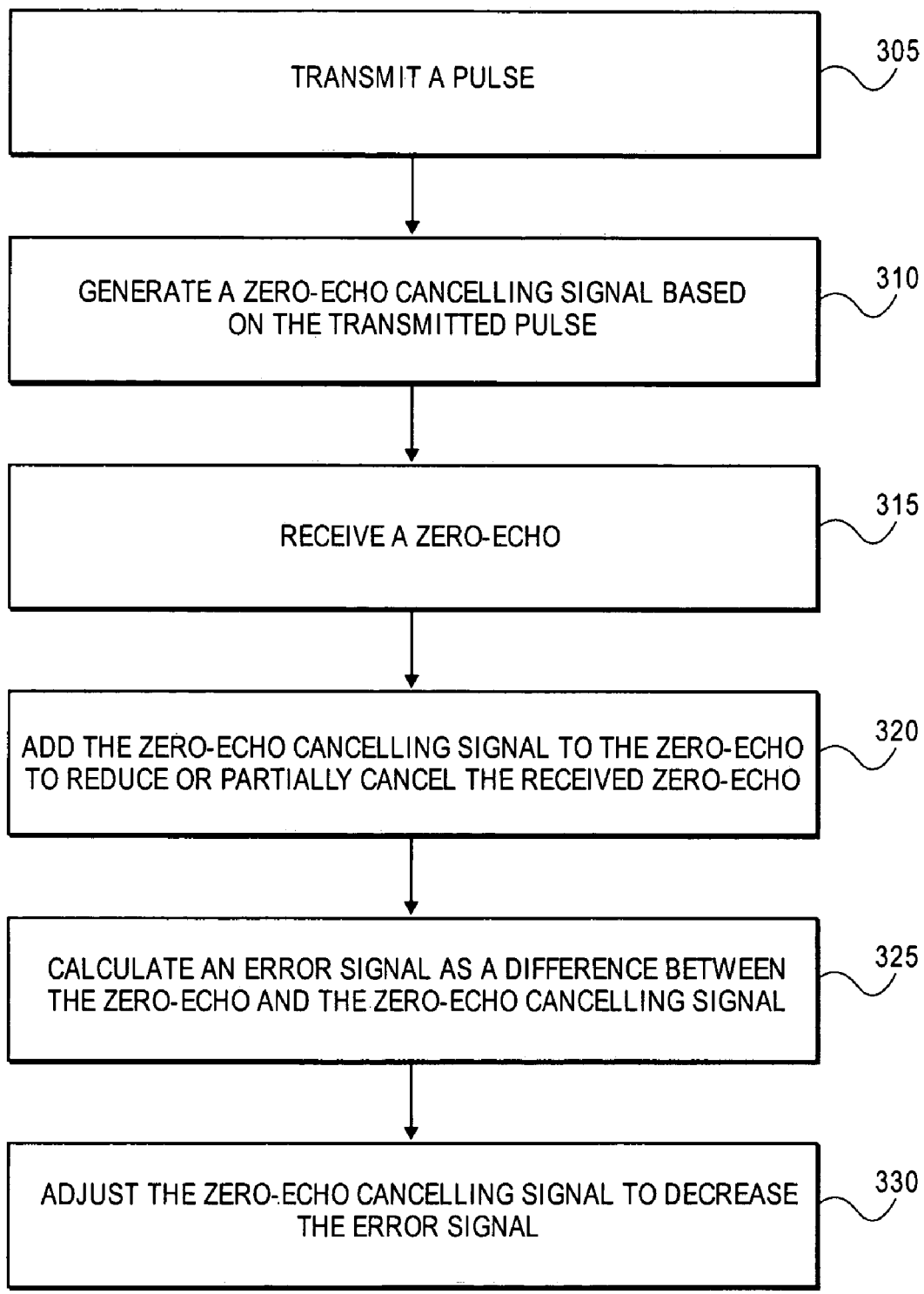
FIG. 3 is a flow chart illustrating operation of a reflectometer according to an example embodiment.

FIG. 3 is a flow chart illustrating operation of a reflectometer according to an example embodiment. At 305, a pulse is transmitted. For example, the pulse may be transmitted to a loop 115 or line to be tested. The (full) reflection for the full path ABCBD may be the reflection of interest since it may characterize the loop or be used to analyze the loop.

At 310, a zero-echo canceling signal may be generated based on the transmitted pulse (this may be a signal that may be estimated to assist in canceling or reducing the zero-echo). At 315, a zero-echo (or short path reflection) may be received or detected, for example, based on the short path reflection from the transmitter to the receiver.

At 320 in FIG. 3, the zero-echo canceling signal may be added to (or combined with) the zero-echo to at least partially cancel or reduce the received zero-echo (e.g., before it is received by the receiver). This may be performed using an adder circuit or a subtraction circuit, although the invention is not limited thereto. According to an example embodiment, by at least partially canceling or reducing the zero-echo, the blind time interval for the receiver 220 may be reduced, although the invention is not limited thereto.

At 325, an error signal may be calculated, for example, as the difference between the zero-echo and the zero-echo canceling signal. At 330, the zero-echo canceling signal is adjusted to decrease the error signal. This adjustment may include adjusting the amplitude of the zero-echo canceling signal. This feedback may allow the zero-echo canceling to be improved or tuned over time.

Figure 4:
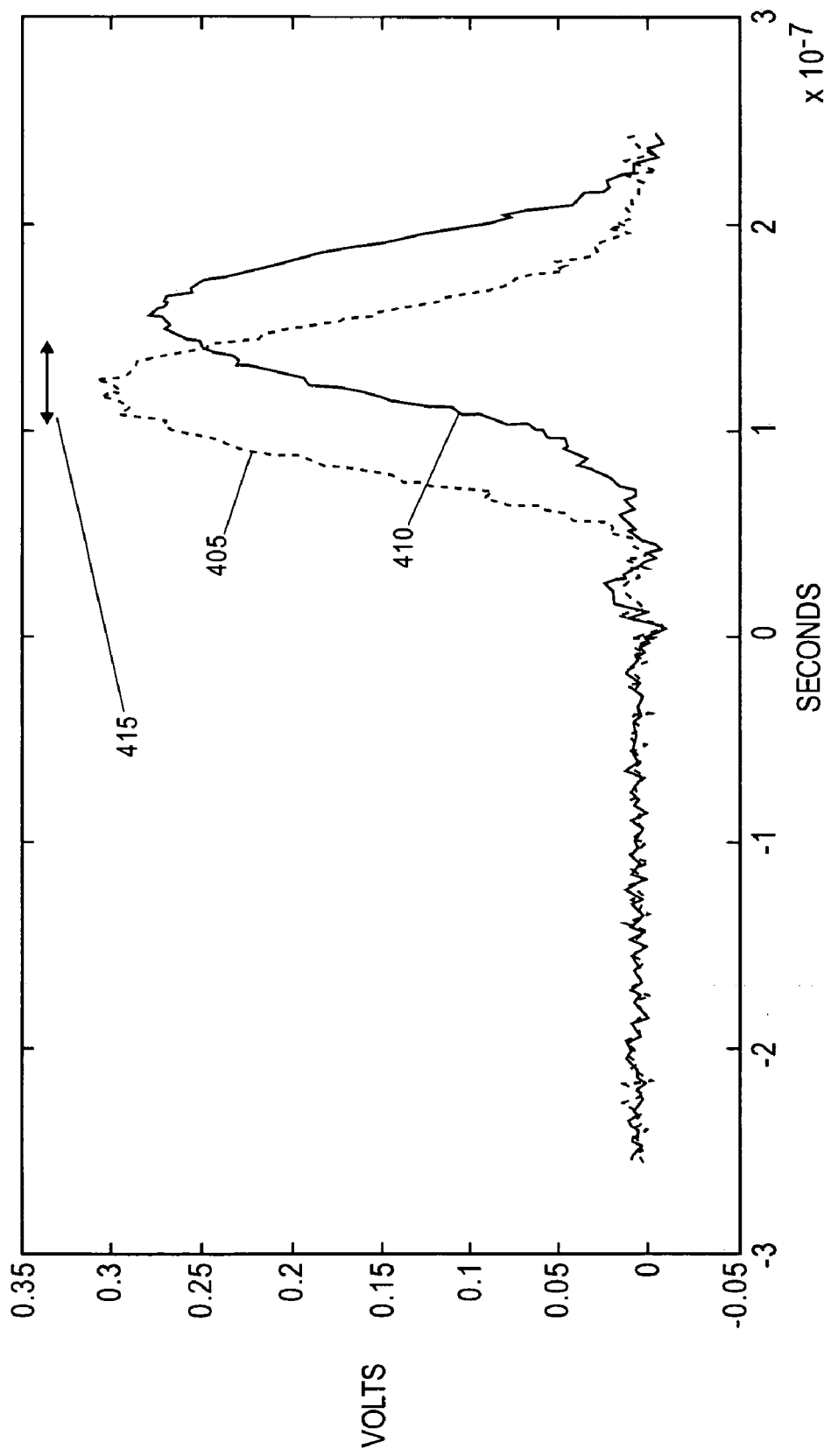
FIG. 4 is a timing diagram illustrating pulse reflections both with and without use of a zero-echo canceling system according to an example embodiment.

FIG. 4 is a timing diagram illustrating pulse reflections both with and without use of a zero-echo canceling system according to an example embodiment. The received pulse 405 may be generated in the absence of a zero-echo canceling system 202 and is shown with the dotted line. The received pulse 405 may include a full path reflection (e.g., reflection of interest traveling path ABCBD) of a pulse that is merged or overlaps with a zero-echo (short path echo traveling path ABD). In this example, the loop to be tested is short enough that the full path reflection is received quickly and overlaps with the zero-echo, such that the two signals appear as one received pulse 405. As a result of the merger or overlapping of these two signals, the beginning and end of the full path reflection cannot be identified, and creates a blind time interval 415 during which detection of a full path reflection of interest may be difficult. In an example embodiment, a 1 microsecond pulse transmitted onto a loop that is 300 feet or shorter may have a return reflection that overlaps with a zero-echo. This description is simply an example and the invention is not limited thereto.

In FIG. 4, the full path reflection 410 is shown in the solid line and is received by receiver 220 when a zero-echo canceling system (such as system 202, for example) may be used to at least partially cancel or attenuate the zero-echo. In this case, the full path reflection 410 is received substantially without the presence of the zero-echo. Therefore, the use of a zero-echo canceling system may be used to substantially eliminate or at least decrease the blind time interval for the receiver, allowing even relatively short loops to be tested using TDR.

Figure 5:
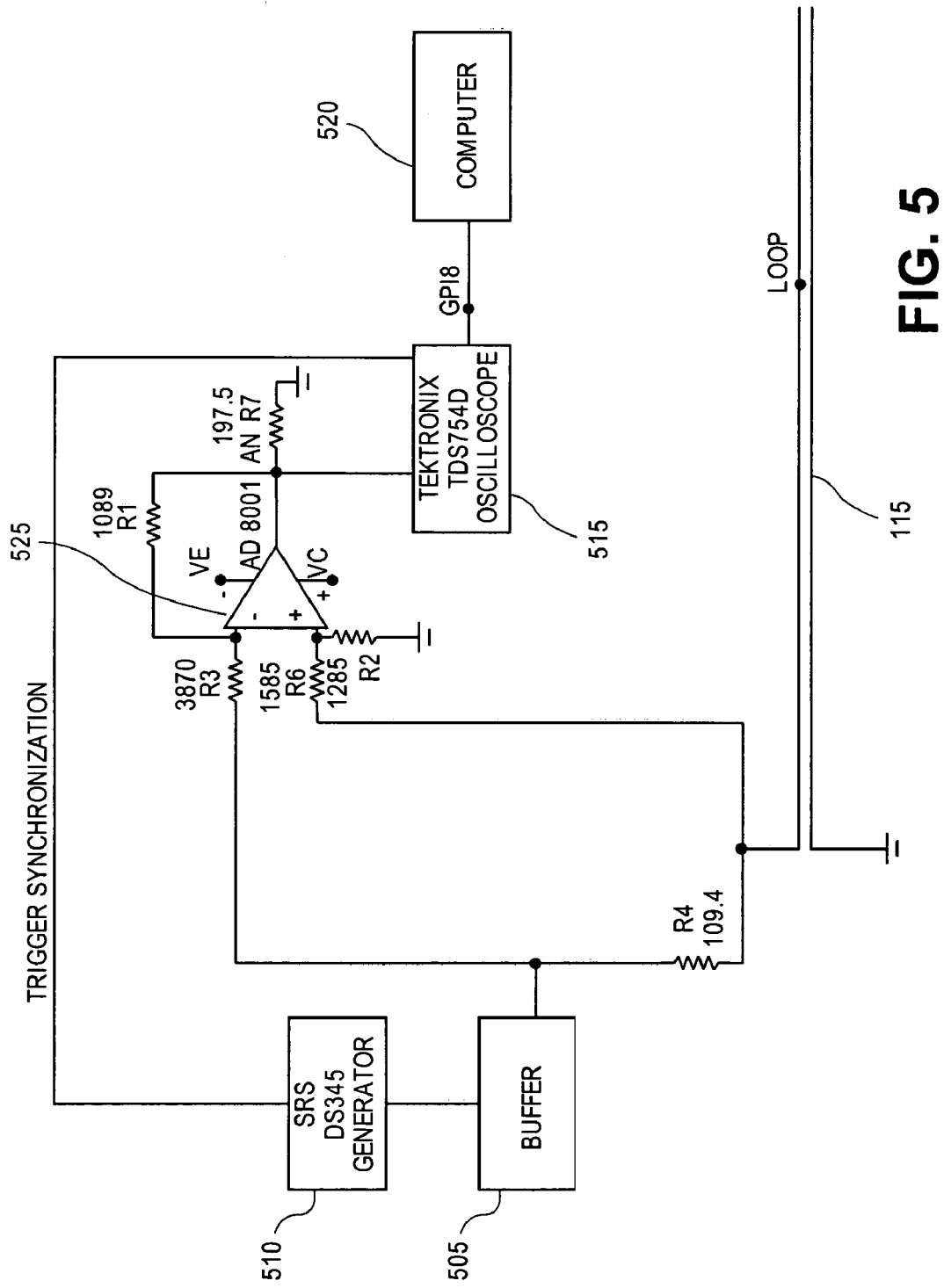
FIG. 5 is a diagram illustrating a reflectometer according to another example embodiment.

FIG. 5 is a diagram illustrating a reflectometer according to another example embodiment. Referring to FIG. 5, a pulse generator 510 may be provided, such as a Stanford Research Systems (SRS) DS345 generator. The generator 510 is coupled to a loop 115 via a buffer 505 and resistor R4. R4 may be comparable to voltage divider 205 of FIG. 2. A zero-echo may be input to R6 based on the transmission of a pulse from generator 510 and reflection at loop 115, for example. The output impedance of buffer 505 may be very low so that any reflection received at R4 will not be substantially transferred to R3.

A zero-echo canceling signal may be input to R3 based on the generated pulse via buffer 505. Resistors R3 and R1 may be variable resistors or potentiometers to allow a variable portion of the transmitted pulse to be input to operational amplifier (op amp) 525 as a zero-echo canceling signal. The zero-echo is input to op amp 525 via resistor R6. Op amp 525 may output the difference between the zero-echo (e.g., input via R6) and the zero-echo canceling signal (e.g., input via R3) to output an error signal to a receiver 515. Receiver 515 may be, for example, a Tektronix TDS754D Oscilloscope, and may include a computer 520. Computer 520 may be coupled to oscilloscope via a bus, such as a general purpose interface bus, or the like, although the invention is not limited thereto. The resulting cancelled (or partially cancelled) zero-echo may be provided as an error signal to computer 520. Computer 520 may then adjust the values of resistor R1 and/or R3, for example, to adjust the zero-echo canceling signal in order to decrease the zero-echo received by oscilloscope 515, although the invention is not limited thereto. The generator 510 and the oscilloscope 515 may be synchronized via a trigger synchronization signal.

Figure 6:
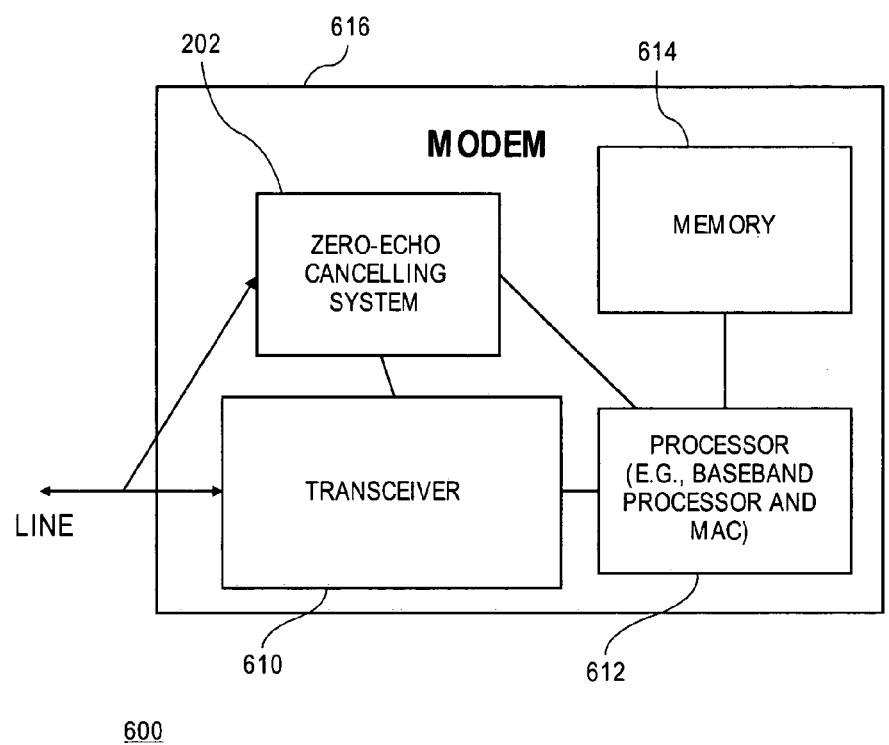
FIG. 6 is a block diagram illustrating a modem according to an example embodiment.

FIG. 6 is a block diagram illustrating a modem (modulator/demodulator) according to an example embodiment. Modem 616 may be a cable modem, a DSL modem, or other modem, for example, although the invention is not limited thereto. Modem 616 may include, for example, a transceiver 610 (including a transmitter and a receiver) for transmitting and receiving signals, including transmitting pulses and receiving reflections or echoes. A processor 612 and a memory 614 are coupled to the transceiver. A zero-echo canceling system, such as system 202, may be coupled to transceiver 610 and processor 612. Processor 612 may control various tasks performed by modem 616 including controlling the operation of zero-echo canceling system 202. Modem 616 may operate to transmit and receive data over a line, or may operate to test the line by transmitting a pulse and receiving a full path reflection. Modem 616 may advantageously at least partially cancel or reduce a zero-echo to eliminate or at least reduce a blind time interval as received by transceiver 610.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of reducing a zero-echo comprising:
   transmitting a pulse to a line to be tested;
   generating a zero-echo canceling signal based on the transmitted pulse;
   receiving a zero-echo;
   adding or combining the zero-echo and the zero-echo canceling signal to reduce the received zero-echo; and
   calculating an error signal as a difference between the zero-echo and the zero-echo canceling signal.

2. The method of claim 1 and further comprising adjusting the zero-echo canceling signal based on the error signal to decrease the error signal and decrease a received zero-echo.

3. The method of claim 1 and further comprising receiving a full-path reflection, wherein the zero-echo has been sufficiently cancelled or attenuated based on said adding or combining to allow the full-path reflection to be detected.

4. The method of claim 1 wherein said transmitting a pulse comprises: transmitting a pulse to a line to be tested, a portion of the transmitted pulse also propagating via a short path towards a receiver as the zero-echo.

5. The method of claim 3 wherein the adjusting comprises adjusting the value of a voltage bridge or adjusting the value of a variable resistor.

6. An apparatus comprising:
   a pulse transmitter to transmit a pulse to a line to be tested;
   a receiver adapted to receive a reflection of the transmitted pulse; and
   a zero-echo canceling system coupled to the transmitter and receiver, the zero-echo canceling system adapted to at least partially cancel a received zero-echo by generating a zero-echo canceling signal based on the transmitted pulse and to calculate an error signal as a difference between the zero-echo and the zero-echo canceling signal.

7. The apparatus of claim 6 and wherein the zero-echo canceling system comprises a zero-echo canceller adapted to generate a zero-echo canceling signal.

8. The apparatus of claim 6 and wherein the zero-echo canceling system comprises:
   a voltage divider coupled to the transmitter;
   a zero-echo canceller coupled to the voltage divider;
   a combining circuit coupled to the voltage divider and the zero-echo canceller, the combining circuit adapted to combine a zero-echo received from the voltage divider and a zero-echo canceling signal received from the zero-echo canceller.

9. The apparatus of claim 8 wherein the combining circuit comprises an adder.

10. The apparatus of claim 8 wherein the combining circuit comprises a subtraction circuit.

11. The apparatus of claim 7 wherein the zero-echo canceller comprises a variable voltage divider.

12. The apparatus of claim 11 wherein the variable voltage divider comprises a variable resistor.

13. A modem comprising:
    a transceiver;
    a processor coupled to the transceiver;
    a zero-echo canceling system coupled to the transceiver and the processor, the zero-echo canceling system adapted to at least partially cancel a zero-echo by generating a zero-echo canceling signal based on a transmitted pulse and to calculate an error signal as a difference between the zero-echo and the zero-echo canceling signal.

14. The modem of claim 13 and further comprising a memory coupled to the processor.

15. The modem of claim 13 wherein the zero-echo canceling system comprises:
    a voltage divider coupled to the transmitter;
    a zero-echo canceller coupled to the voltage divider;
    a combining circuit coupled to the voltage divider and the zero-echo canceller, the combining circuit adapted to combine a zero-echo received from the voltage divider and a zero-echo canceling signal received from the zero-echo canceller.

16. The modem of claim 13 wherein the modem comprises a cable modem.

17. The modem of claim 13 wherein the modem comprises a DSL modem.

* * * * *